United States Patent
Calhoun et al.

(10) Patent No.: US 10,164,432 B2
(45) Date of Patent: Dec. 25, 2018

(54) SYSTEMS, METHODS, AND APPARATUS FOR POWERING DEVICES USING ENERGY FROM A COMMUNICATION BUS

(71) Applicant: PsiKick, Inc., Charlottesville, VA (US)

(72) Inventors: Benton Calhoun, Charlottesville, VA (US); David Wentzloff, Ann Arbor, MI (US)

(73) Assignee: PsiKick, Inc., Santa Clara, CA (US)

( * ) Notice: Subject to any disclaimer, the term of this patent is extended or adjusted under 35 U.S.C. 154(b) by 186 days.

(21) Appl. No.: 14/766,690

(22) PCT Filed: Feb. 19, 2014

(86) PCT No.: PCT/US2014/017033
§ 371 (c)(1),
(2) Date: Aug. 7, 2015

(87) PCT Pub. No.: WO2014/130502
PCT Pub. Date: Aug. 28, 2014

(65) Prior Publication Data
US 2015/0380935 A1    Dec. 31, 2015

Related U.S. Application Data

(60) Provisional application No. 61/766,449, filed on Feb. 19, 2013.

(51) Int. Cl.
*H02J 3/02* (2006.01)
*G06F 1/26* (2006.01)

(52) U.S. Cl.
CPC .............. *H02J 3/02* (2013.01); *G06F 1/26* (2013.01); *G06F 1/266* (2013.01)

(58) Field of Classification Search
None
See application file for complete search history.

(56) References Cited

U.S. PATENT DOCUMENTS

| | | | |
|---|---|---|---|
| 8,237,414 B1 | 8/2012 | Li et al. | |
| 2009/0193268 A1* | 7/2009 | Kreiner | G06F 1/266 713/300 |
| 2010/0280676 A1* | 11/2010 | Pabon | G06F 1/266 700/295 |
| 2012/0161721 A1 | 6/2012 | Neethimanickam | |

(Continued)

OTHER PUBLICATIONS

International Search Report and Written Opinion for International Application No. PCT/US20114/017033, dated Jun. 26, 2014.

(Continued)

*Primary Examiner* — Jared Fureman
*Assistant Examiner* — Aqeel Bukhari
(74) *Attorney, Agent, or Firm* — Weaver Austin Villeneuve & Sampson LLP (57) ABSTRACT

In some embodiments, an apparatus includes a power source, a communication bus, a first electrical component connected to the power source and the communication bus, and a second electrical component connected to the communication bus. In such embodiments, the second electrical component can be to be powered by the communication bus such that performance of the communication bus does not fall below a specified performance for the communication bus.

21 Claims, 7 Drawing Sheets

(56) References Cited

U.S. PATENT DOCUMENTS

2012/0323399 A1     12/2012   Hoffknecht et al.
2012/0324257 A1*    12/2012   Hoffknecht ............... G06F 1/26
                                                            713/320

OTHER PUBLICATIONS

International Preliminary Report on Patentability and Written Opinion for International Application No. PCT/US2014/017033, dated Aug. 25, 2015.

* cited by examiner

SYSTEMS, METHODS, AND APPARATUS FOR POWERING DEVICES USING ENERGY FROM A COMMUNICATION BUS

CROSS-REFERENCE TO RELATED PATENT APPLICATION

This application claims priority under 35 U.S.C. § 371 to, and is a U.S. national phase application of, International Application No. PCT/US2014/017033, filed Feb. 19, 2014, entitled "SYSTEMS, METHODS, AND APPARATUS FOR POWERING DEVICES USING ENERGY FROM A COMMUNICATION BUS," which claims priority to and the benefit of U.S. Provisional Application No. 61/766,449, filed Feb. 19, 2013 entitled "Systems, Methods, and Apparatus for Powering Devices Using Energy From a Communication Bus," both of which are incorporated herein by reference in their entireties.

BACKGROUND

Some embodiments described herein relate generally to the methods and apparatus for powering devices using energy from a communication bus.

Portable systems that operate from a battery and/or from power harvested from the environment need to consume small amounts of energy to prolong the system lifetime for a given amount of available energy. The energy budget for a portable system affects a widening set of applications due to a combination of requirements for smaller size (less battery volume, so less energy available), longer lifetimes (need to make energy last longer), and/or more functionality (need to do more with the same amount of energy). Many portable electronic devices combine multiple electrical components into larger circuits or systems, for example, integrated onto a printed circuit board (PCB), flexible circuit board, or other substrate. Portable systems that integrate multiple electrical components typically have a tight energy budget, and adding more components to the system usually cuts into the power budget of the larger system.

Thus, a need exists for systems and methods to add new electrical components to a portable electrical system without requiring allocation of additional energy from the original power budget.

SUMMARY

In some embodiments, an apparatus includes a power source, a communication bus, a first electrical component connected to the power source and the communication bus, and a second electrical component connected to the communication bus. In such embodiments, the second electrical component can be powered by the communication bus such that performance of the communication bus does not fall below a specified performance for the communication bus.

DETAILED DESCRIPTION

In some embodiments, an apparatus includes a power source, a communication bus, a first electrical component connected to the power source and the communication bus, and a second electrical component connected to the communication bus. In such embodiments, the second electrical component can be powered by the communication bus such that performance of the communication bus does not fall below a specified performance for the communication bus.

In some embodiments, an apparatus includes an electrical component having a receiver that receives power from a communication bus of a host electrical system. In such embodiments, the communication bus is operative, such that (1) the performance of the communication bus does not fall below a specified performance for the communication bus, and (2) the performance of a host electrical component of the host electrical system operably coupled to the communication bus and powered by a power source of the host electrical system does not fall below a specified performance for the host electrical component.

In some embodiments, an apparatus includes a host electrical system including a power source, a communication bus, and a host electrical component connected to the power source and the communication bus. In such embodiments, the apparatus also includes an electrical component connected to the communication bus, and the electrical component is powered by the communication bus when the host electrical system is operative such that (1) the performance of the communication bus does not fall below a specified performance for the communication bus when the electrical component is powered by the communication bus, and (2) the performance of the host electrical component is not negatively affected when the electrical component is powered by the communication bus.

System, methods, and apparatus for powering an electrical component from a communication bus are described herein. The communication bus has the primary purpose of providing wired communication between the different electrical components. The electrical components using the communication bus for communication can also draw power from the bus without inhibiting normal communication on the bus. In such instances, power can be drawn not from a dedicated bus line with a direct current (DC) voltage, but from lines in the communication bus that are used for communication and that switch their voltage during normal bus operation.

As used in this specification, a communication bus can refer to a specific collection of wires that use a defined specification or protocol for communication. This can include, for example, universal serial bus (USB), universal asynchronous receiver/transmitter (UART) bus, I²C bus, serial peripheral interface (SPI) bus, etc. Additionally, as used in this specification, the term communication bus can also refer to a collection of wires used for signaling that do not adhere to a pre-defined specification or protocol.

As used in this specification, any wire connecting a new electrical component to the system that provides a stable DC voltage or a connection to the energy storage node (e.g. battery or storage capacitor) is effectively a VDD wire.

As used in this specification, the singular forms "a," "an" and "the" include plural referents unless the context clearly dictates otherwise. Thus, for example, the term "an electrical component" is intended to mean a single electrical component or a combination of electrical components.

Figure 1:
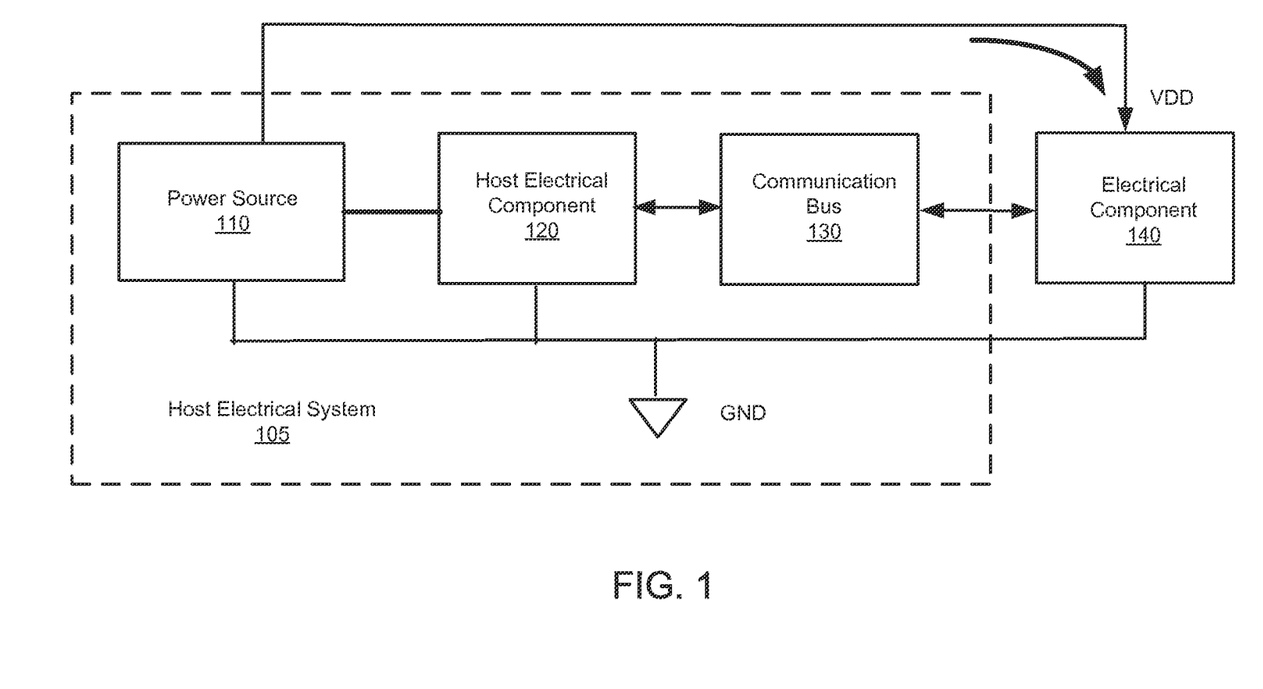
FIG. 1 is a system block diagram of a host electrical system having an explicit connection to an external electrical component, according to an embodiment.

FIG. 1 is a system block diagram of a host electrical system having an explicit connection to an external electrical component, according to an embodiment. The host electrical system 105 includes a power source 110, a host electrical component 120, and a communication bus 130. The power source 110 can be, for example, a battery, super capacitor, or energy harvesting circuit, that can provide power to the rest of the host electronic system 105. The communication bus 130 can be, for example, a collection of conducting wires used for providing a medium for communication of data between the (external) electrical component 140 and the host electrical system 105. A host electrical component 120 can be, for example, a single integrated circuit (IC), a multi-chip module (MCM), a packaged part, a system on chip (SoC), a system in package (SiP), etc.) that can be placed into a larger host electronic system 105 with other components (e.g., on a printed circuit board (PCB) or similar electrical substrate: flex PCB, MCM, system in package, etc.) (not shown). The host electrical component 120 can be powered by the power source 110 of the electrical system 105 and can communicate with other electrical components (not shown) of the electrical system 105.

The host electrical system 105 is electronically connected to the external electrical component 140. An explicit connection of the power source 110 to the (external) electronic component 140 can provide power to the electronic component 140 and thus can involve an adjustment to the power budget of the host electrical system 105. In some instances, an explicit conductive connection can be made from the power source 110 to the electronic component 140 to supply the electronic component 140 with power. The electronic component 140 can draw power through this power supply node, which is referred to herein as VDD. Because the electronic component 140 draws power from the electronic system 105 that was unaccounted for prior to inclusion of the electronic component 140, such a connection can undesirably impact the power budget of the electronic system 105.

Figure 2:
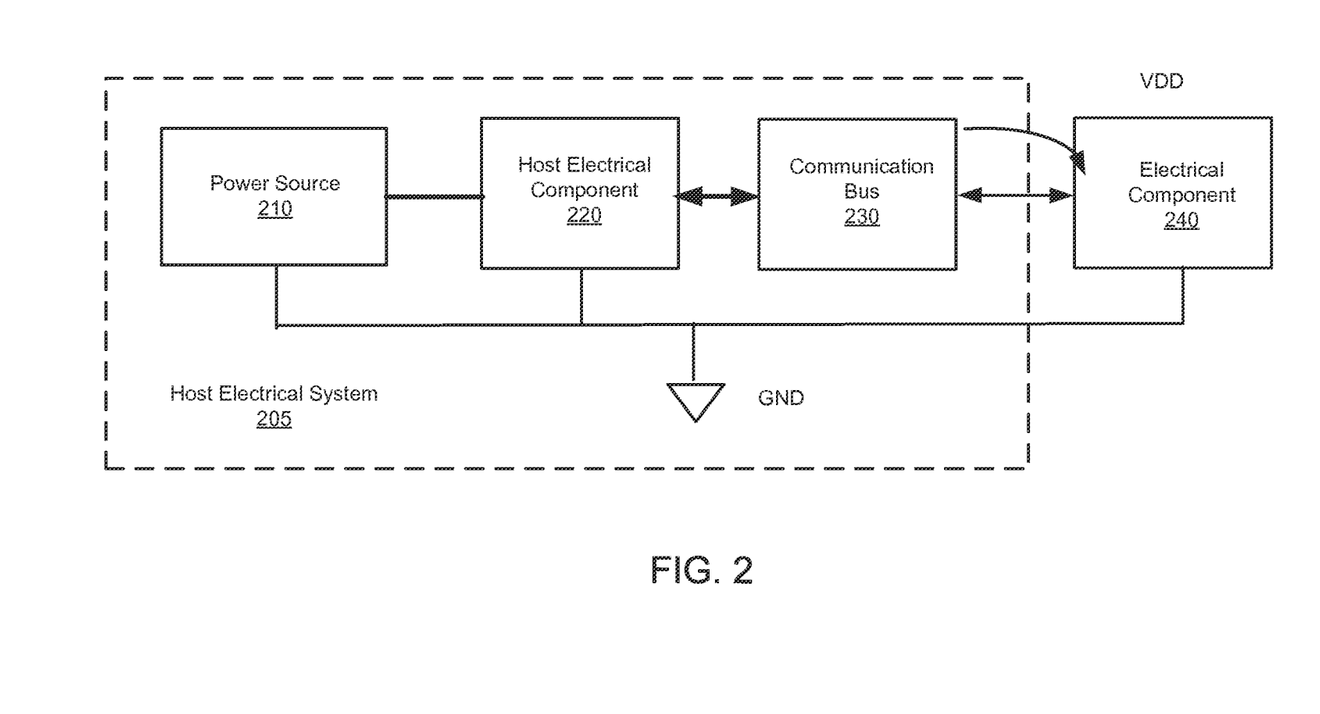
FIG. 2 is a system block diagram of a host electrical system with a power source that has no explicit connection to an external electronic component, according to an embodiment.

FIG. 2 is a system block diagram of a host electrical system with a power source having no explicit connection to an external electronic component, according to an embodiment. The host electrical system 205 includes a power source 210, a host electrical component 220, and a communication bus 230. The host electrical system 205 is similar to the host electrical system discussed in FIG. 1. In FIG. 2, the electrical component 240 is powered by the communication bus 230, without being powered by the power source 210, when the communication bus 230 is operable. The communication bus 230 can provide, for example, a fixed direct current (DC) voltage, and the (second or external) electrical component 240 can draw a fixed amount of current from the communication bus 230.

In the system shown in FIG. 2, the communication bus 230 can be in a first state during a first time period and in a second state during a second time period mutually exclusive from the first time period, and an amount of voltage present in the communication bus 230 during the first state can differ from the amount of voltage during the second state. In such instances, the external electrical component 240 can draw an amount of current from the communication bus 230 when the communication bus 230 is in the first state and draw less current from the communication bus when the communication bus 230 is in the second state that is the amount of current from the communication bus 230 when the communication bus 230 is in the first state.

In such instances as shown in FIG. 2, power can be drawn from the communication bus 230 such that normal communication by electrical components connected to the communication bus 230 is not prevented. Furthermore, power is drawn from the communication bus 230 in such a way that the drivers and receivers attached to the communication bus 230 do not observe any power drawn greater than the power draw specified originally for the communication bus 230. Because the power is drawn by the (external) electrical component 240 within the specification for the bus power, the inclusion of the electrical component 240 in the host electrical system 205 does not adversely impact the power budget of the host electrical system 205. Instead, in such instances, the electrical component 240 consumes some of the power that was already allocated for use on the communication bus 230. In such instances, the electrical component 240 can affect the rest of the electronic system 205 as if using essentially zero power because that electrical component 240 does not draw power from the communication bus 230 beyond what would be expected for typical communication using the communication bus 230. In such instances, the electrical component 240 is powered by the communication bus 230, without being powered by the power source 210, when the communication bus 230 is operable. Said in another way, in such instances, the electrical component 240 can include a receiver (not shown in FIG. 2) that receives power from a communication bus 230 of the host electrical system 205, when the communication bus 230 is operative, such that the performance of the communication bus 230 does not fall below a specified performance for the communication bus 230. Additionally, in such instances, the performance of the host electrical component 220 of the host electrical system 205 that is operably coupled to the communication bus 230 and is powered by the power source 210 of the host electrical system 205 also does not fall below a specified performance for the host electrical component 220.

Figure 3:
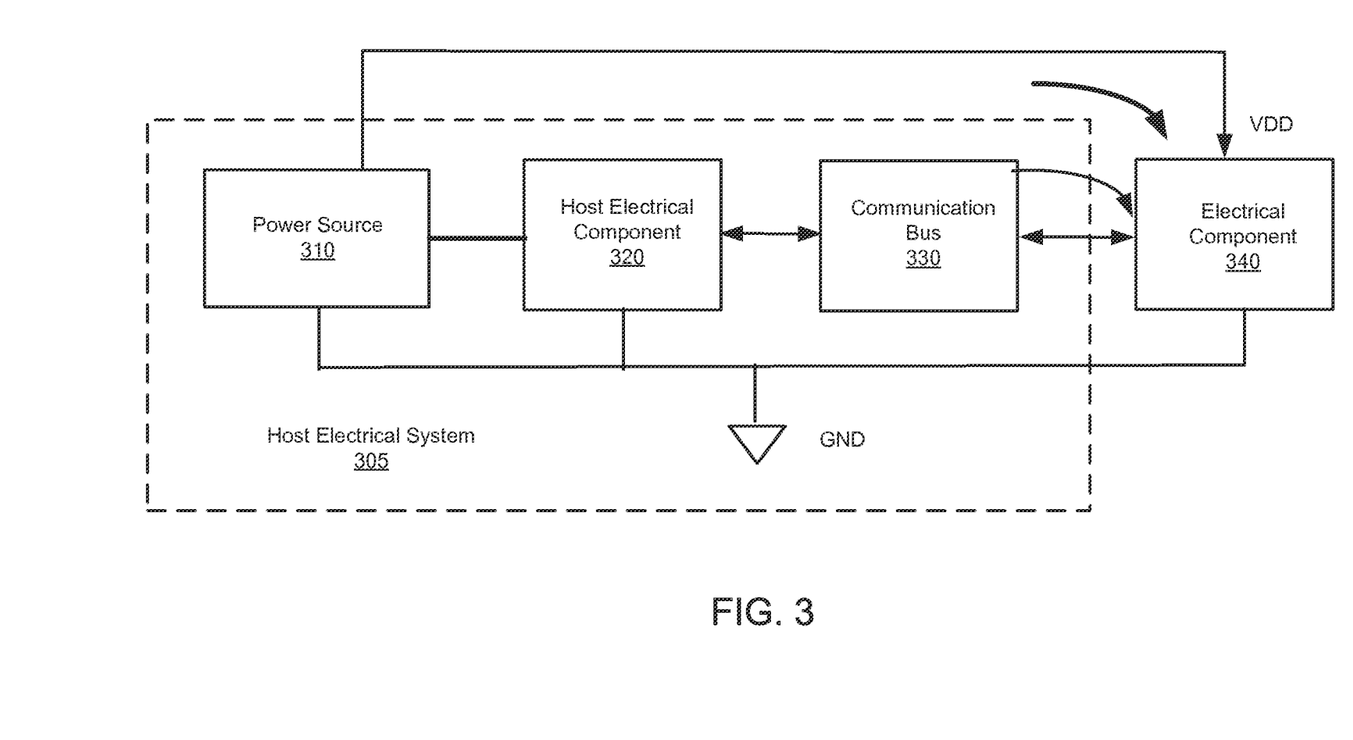
FIG. 3 is a system block diagram of a host electrical system with a power source that has an explicit connection to an external electrical component in parallel with power sent over the communication bus, according to an embodiment.

FIG. 3 is a system block diagram of a host electrical system with a power source having an explicit connection to an external electrical component in parallel with power sent over the communication bus, according to an embodiment. The host electrical system 305 includes a power source 310, a host electrical component 320, and a communication bus 330. The host electrical system 305 is similar to the host electrical systems 105 and 205 as discussed in FIGS. 1-2, respectively. In the instance shown in FIG. 3, the power consumed by the electrical component 340 is provided by one or both of the communication bus 330 and the VDD connection. In such instances, the amount of power that can be drawn directly from the power source 310 is reduced by the amount of power that is delivered through the communication bus 330. In other words, in such instances, an explicit power connection to the electrical component 340 may exist, but the electrical component 340 draws at least a part or all of its power from the communication bus 330. Said in another way, in such instances, the electrical component 340 is powered collectively by the communication bus 330 and the power source 310 such that an amount of power drawn from the power source 310 by the electrical component 340 is less than if the electrical component 340 was powered by the power source 310 without the communication bus 330.

Figure 4:
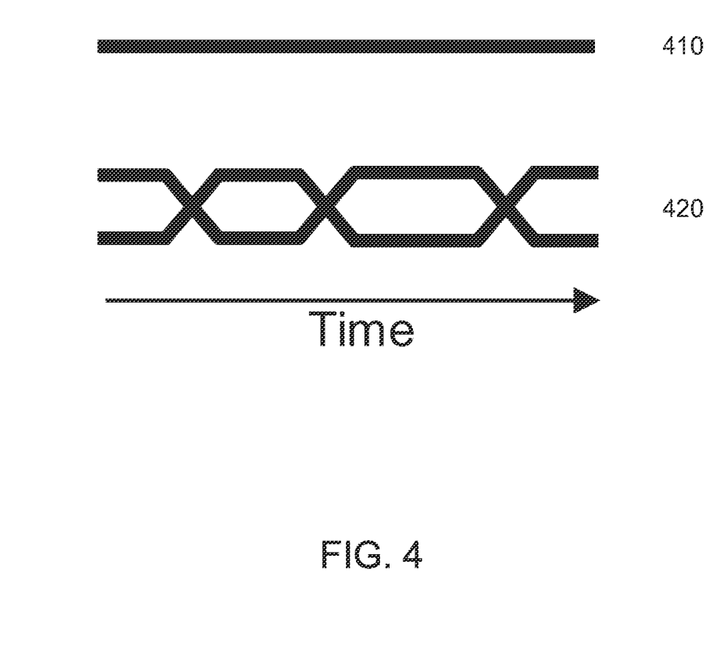
FIG. 4 shows the time varying voltage patterns for two types of wires that can occur in a communication bus, according to an embodiment.

FIG. 4 shows the time varying voltage patterns for two types of wires that can occur in a communication bus, according to an embodiment. The first voltage 410 is associated with a fixed wire that can supply a given DC voltage continuously. For example, the first voltage 410 can be associated with universal serial bus (USB) that has, for example, a 5V wire as part of its standard interface, where power can be drawn from such fixed voltages. The USB defines current levels (e.g., in the 100's of milliamps) that can be drawn from the 5V supply for the purpose of powering or recharging devices connected to the communication bus. In contrast, for some systems described herein, the power can be from voltage sources as exemplified by the second time varying voltage pattern 420 that are intended to switch during communication.

Figure 5:
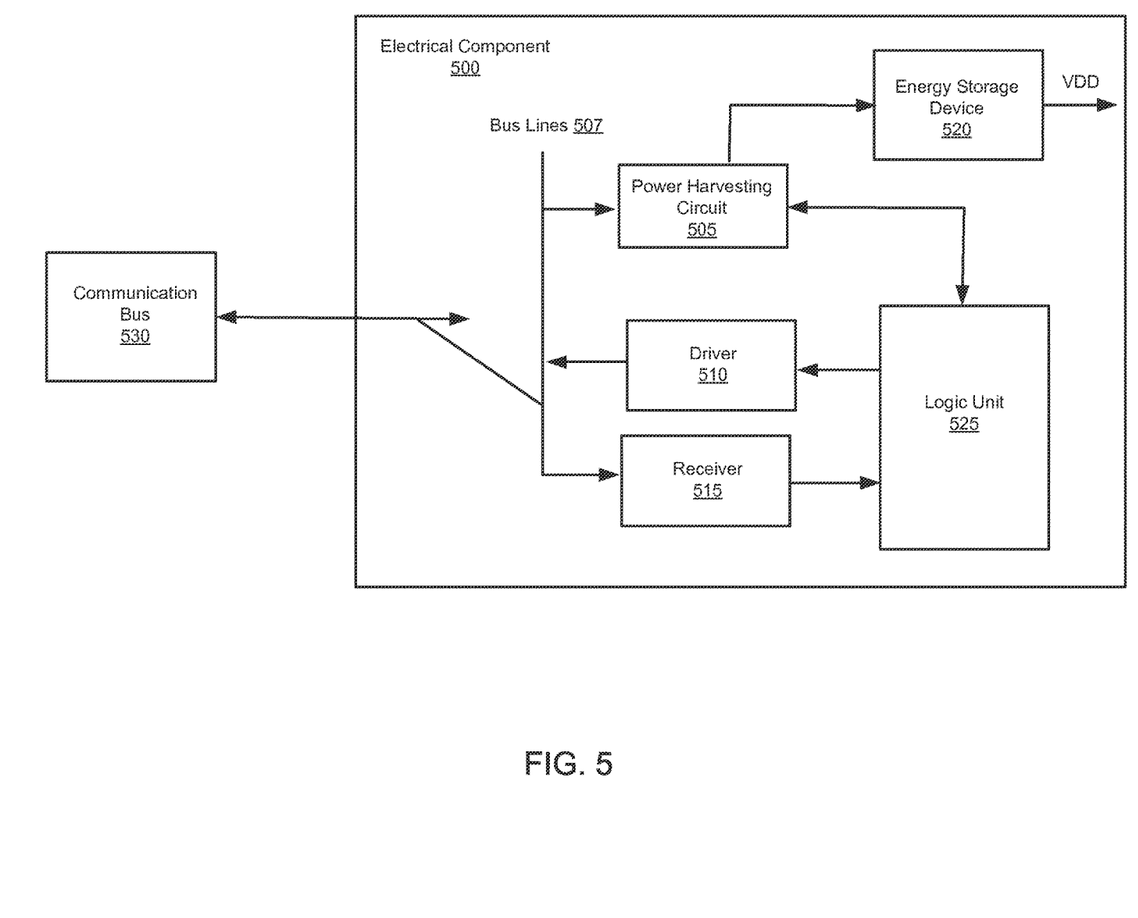
FIG. 5 is a system block diagram of an electrical component that performs power collection from a communication bus, according to an embodiment.

FIG. 5 is a system block diagram of an electrical component that performs power collection from a communication bus, according to an embodiment. The electrical component 500 can be associated with any electrical component. Each communication bus line(s) 507 connects to communication circuits having one or more of a driver 510 (for writing to the communication bus 530) and a receiver 515 (for reading from the communication bus 530). The logic unit 525 captures data from the signals on the communication bus 530 and for preparing the data to write to the communication bus 530. In some instances, if the communication bus 530 is implemented using a specific standard or protocol, then the logic unit 525 and bus interface circuits (e.g., receiver 515 and driver 510) implement communication in compliance with the specific standard or protocol. In addition to the communication circuits, the electrical component 500 also includes a power harvesting circuit 505 to connect to one or more of the communication wires in the communication bus 530. The power harvesting circuit 505 is able to harvest power from the communication bus for use in powering the electrical component 500. The power harvesting circuit 505 can also effectively act as a power converter that captures energy from the communication bus 530 and converts the captured energy into stored energy that is stored in the energy storage device 520 for use later in the system. Information from the logic unit 525 is communicated to the power harvesting circuit 505 to help direct its operation and to ensure that it is not interfering with the communication occurring on the communication bus 530.

Energy drawn from the bus line(s) 507 can be stored in the electrical component on for example, a capacitor, a super capacitor, a rechargeable battery, or any other energy reservoir of energy storage device 520. From there, the energy can be further converted or regulated or directly supplied for use by the electrical component 500. In some instances, the stored energy may be supplied directly from the power harvesting circuit 505 to the remaining portions of the electrical component 500 without explicit storage.

Note that the power harvesting circuit 505 does not prevent or disrupt normal communication on the communication bus 530 such as, for example, in the case of an I²C bus. I²C is a serial communication protocol that uses two wires for communication among multiple components. Each bus line is held to a high voltage level (e.g., 3.3V) through a pull up resistor, and several components drive the bus to a low voltage level to write a logical '0' to the bus. The I²C bus specification provides constraints on parameters like the acceptable range for a high level input, the acceptable range for a low level input, the output current for a bus driver, the output fall time, the capacitance allowed per pin, and the steady state input current per I/O pin. In this example, the components described herein meet all of these specifications, thereby not impeding normal communication by itself or by other components using the communication bus 530. Opportunities for harvesting energy from this bus line, however, still exist without violating the specification. For example, the input current allowable at each I/O pin of an I²C bus is 10 μAmps. The power harvesting circuit 505 described herein can load each bus line with a constant current draw of less than 10 μAmps and remain within the specified bounds of the specification. This current can be used to supply power to the electrical component 500. As another example, the maximum capacitance allowable for each I/O pin is 10 pF. If the components described herein can be designed to communicate on the I²C bus with a load lower than 10 pF, then such a component can intermittently add an extra capacitive load to the communication bus 530 that is less than the difference between 10 pF and its natural load. By adding this load to the communication bus 530 whenever the communication bus 530 is in a low state, the electrical component 500 can allow the bus to charge up this extra capacitor and use that energy to power the electrical component 500.

In some configurations, the communication bus can include a first line and a second line. In such configurations, the electrical component can include a power harvesting circuit that has a first portion, a second portion, and a controller. In such configurations, the first portion of the power harvesting circuit can be operatively coupled to the first line of the communication line, where the first portion of the power harvesting circuit can store energy from the communication bus when activated by the controller. In such configurations, the second portion of the power harvesting circuit can be operatively coupled to the second line of the communication line and the second portion of the power harvesting circuit can store energy from the communication bus when activated by the controller.

The following are examples of two categories of harvesting power from a communications bus. The first example relates to a category of harvesting power from a line of a communication bus when it is in a temporarily steady state. When the communication bus is in such a steady state condition, the power harvesting circuit can draw a fixed amount of current from the communication bus, not to exceed the specified input current or leakage current allowable on the communication bus. A number of circuit options exist for drawing energy from the fixed voltage supply in the communications bus. For example, a switched-inductor boost converter topology can alternatively draw current from the bus line to charge an inductor and then allow that inductor to discharge the current onto a storage capacitor or into a rechargeable battery. Alternatively, a switched capacitor charge pump can draw current from the communication bus line to charge a capacitor, then in another clock phase transfer the charge from that capacitor to an energy storage device (e.g., a storage node).

Figure 6:
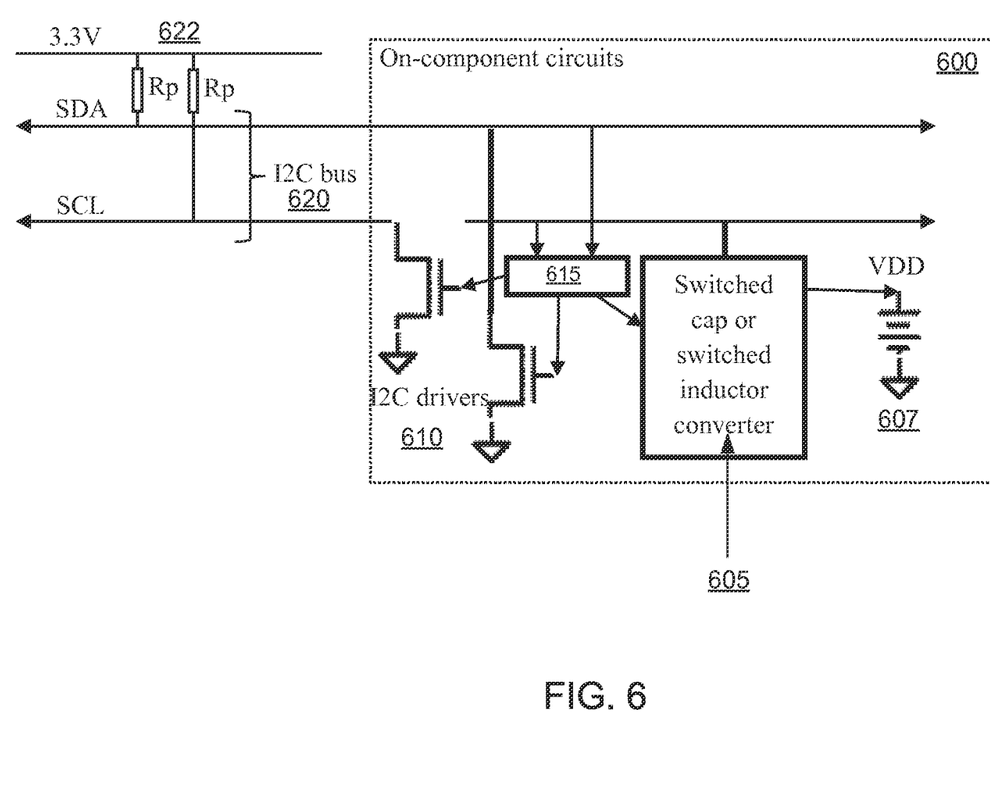
FIG. 6 shows an $I^2C$ bus with a switched inductor boost converter (or switched capacitor charge pump) circuit, according to an embodiment.

FIG. 6 shows an I²C bus with a switched inductor boost converter (or switched capacitor charge pump) circuit, according to an embodiment. I²C buses uses two bidirectional open-drain lines, the serial data line (SDA) and the serial clock line (SCL), pulled up with resistors (Rp) 622 as seen in FIG. 6. Typical voltages used are +5 V or +3.3 V although systems with other voltages can also be permitted. The on-component circuits 600 include I²C drivers 610 (which can be, e.g., NMOS transistors) and a switched inductor boost converter circuit 605 that draws power from one of the bus lines and transfers it to the storage node 607 (e.g., a rechargeable battery). A similar switched inductor boost converter circuit (or power harvesting circuit) (not shown in FIG. 6) can be used on a second bus line. The switched inductor boost converter circuit 605 (power harvesting circuit) can use a method to limit the current it draws from a bus line to be within the specification for that bus line during its steady state condition. For example, in some configurations, a pass transistor preceding a charge pump circuit with its gate bias controlled by a current source can be used to limit the current. In some configurations, the control unit 615 that drives the communication bus and receives the data can, enable the power harvesting circuit whenever the bus line is in a high state and disable it when the bus line goes to a low state.

The second category of harvesting power is drawing power (or energy) from the communication bus line during transitions on the bus. Because the currents used to drive the communication bus during communication are typically much larger than the allowable steady state leakage current on the communication bus, these transitions present an opportunity to harvest larger amounts of power. Accordingly, multiple circuit implementations exist that can take advantage of this category of power harvesting.

Figure 7:
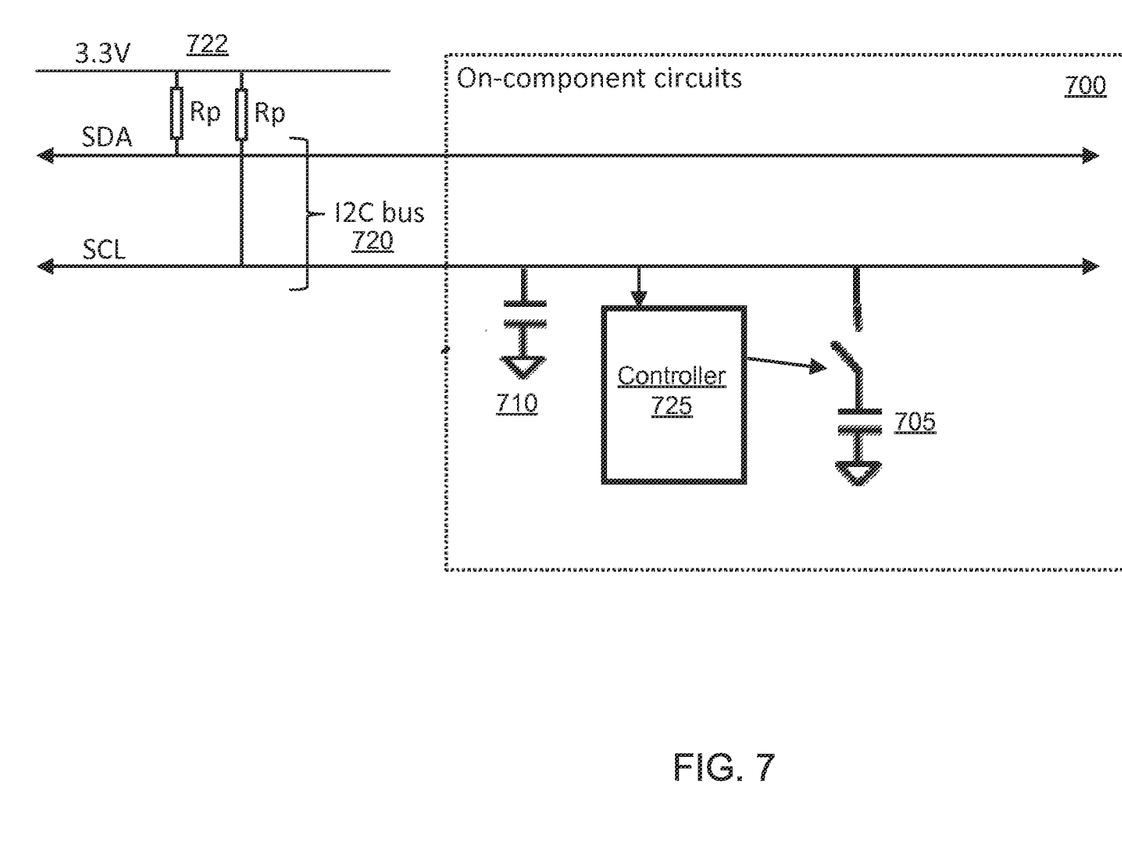
FIG. 7 shows a scheme for using an $I^2C$ bus to charge a local capacitor when the master $I^2C$ bus driver (Rp) drives the communication bus line from the "0" state to the "1" state, according to an embodiment.

FIG. 7 shows a scheme for using an I²C bus to charge a local capacitor when the master I²C bus driver (Rp) drives the communication bus line from the "0" state to the "1" state. In FIG. 7, the bus communication circuits and pads are designed to have a total effective load capacitance less than the specification-defined maximum capacitance. The total effective load capacitance can be, for example, 5 pF and the specification-defined maximum capacitance can be, for example, 10 pF. After charging is complete, the local capacitor 705 can be disconnected from the bus line 720 and its local energy converted for later use. The effective capacitance of the I²C bus driver (Rp) 722 is shown in FIG. 7 as 710 and can be, for example, 5 pF.

When the controller 725 detects that the communication bus is at the "0" state, the controller 725 attaches to the communication bus an additional locally discharged capacitor (e.g., capacitor 705) with a capacitance that will not bring the total capacitance above the specification-defined maximum (e.g., <5 pF) to the line. When the external I²C pull-up resistors Rp 722 drives the communication bus line 720 into the "1" state, it will also charge up the local load capacitor 705. The controller 725 can then disconnect this capacitor 705 from the communication bus and use a converter (not shown) (e.g., like a charge pump) to harvest the charge for local use. An embodiment of this scheme can use multiple capacitors and only connect a subset of them to the communication bus line for different transitions. By alternating among the capacitors, energy can be collected from every transition of the communication bus.

While various embodiments have been described above, it should be understood that they have been presented by way of example only, and not of limitation. Likewise, the various diagrams may depict an example architectural or other configuration for the embodiments, which is done to aid in understanding the features and functionality that can be included. The disclosure is not restricted to the illustrated example architectures or configurations, but can be implemented using a variety of alternative architectures and configurations. Additionally, it should be understood that the various features and functionality described in one or more of the individual embodiments are not limited in their applicability to the particular embodiment with which they are described, but instead can be applied, alone or in some combination, to one or more of the other embodiments, whether or not such embodiments are described and whether or not such features are presented as being a part of a described embodiment. Thus the breadth and scope of the disclosure should not be limited by any of the above-described exemplary embodiments.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors.

What is claimed is:

1. An apparatus, comprising:
   a power source;
   a communication bus;
   a first electrical component connected to the power source and the communication bus; and
   a second electrical component connected to the communication bus, the second electrical component configured to be powered by at least some power obtained directly from the communication bus from power allocated for use on the communication bus such that performance of the communication bus does not fall below a specified performance for the communication bus.

2. The apparatus of claim 1, wherein the second electrical component is not connected to the power source, the second electrical component configured to be powered by the communication bus without being powered by the power source.

3. The apparatus of claim 1, wherein the second electrical component is connected to the power source, the second electrical component configured to be powered collectively by the communication bus and the power source such that an amount of power drawn from the power source by the second electrical component is less than if the second electrical component was powered by the power source without the communication bus.

4. The apparatus of claim 1, wherein the communication bus is configured to provide a fixed direct current (DC) voltage, the second electrical component configured to draw a fixed amount of current from the communication bus.

5. The apparatus of claim 1, wherein:
   the communication bus is configured to use an amount of current during a first time period and an amount of current during a second time period mutually exclusive from the first time period, the amount of current during the first time period being larger than the amount of current during the second time period,
   the second electrical component configured to draw an amount of current during the first time period and not during the second time period.

6. The apparatus of claim 1, wherein:
the second electrical component includes a first portion and a second portion, the first portion of the second electrical component including a power harvesting circuit and an energy storage device,
the power harvesting circuit configured to receive power from the communication bus and store the power in the energy storage device, the second portion of the second electrical component configured to receive energy from the energy storage device.

7. The apparatus of claim 1, wherein:
the communication bus includes a first line and a second line,
the second electrical component including a power harvesting circuit having a first portion, a second portion, and a controller,
the first portion of the power harvesting circuit being operatively coupled to the first line of the communication line, the first portion of the power harvesting circuit storing energy from the communication bus when activated by the controller,
the second portion of the power harvesting circuit being operatively coupled to the second line of the communication line the second portion of the power harvesting circuit storing energy from the communication bus when activated by the controller.

8. The apparatus of claim 1, wherein:
the communication bus is configured to be in a first state during a first time period and in a second state during a second time period mutually exclusive from the first time period, an amount of voltage during the first state differing from an amount of voltage during the second state,
the second electrical component configured to draw an amount of current from the communication bus when the communication bus is in the first state and draw an amount of current from the communication bus when the communication bus is in the second state that is less than the amount of current from the communication bus when the communication bus is in the first state.

9. An apparatus, comprising:
an electrical component having a receiver that receives at least some power directly from a communication bus from power allocated for use on the communication bus of a host electrical system, when the communication bus is operative, such that (1) performance of the communication bus does not fall below a specified performance for the communication bus, and (2) performance of a host electrical component of the host electrical system operably coupled to the communication bus and powered by a power source of the host electrical system does not fall below a specified performance for the host electrical component.

10. The apparatus of claim 9, wherein:
the electrical component is not connected to the power source,
the electrical component is powered by the communication bus, without being powered by the power source, when the communication bus is operable.

11. The apparatus of claim 9, wherein:
the receiver of the electrical component receives power from the power source, when the power source is operative,
the electrical component is powered collectively by the communication bus and the power source, when the communication bus and the power source are operative, such that an amount of power drawn from the power source by the electrical component is less than if the electrical component was powered by the power source without the communication bus.

12. The apparatus of claim 9, wherein the second electrical component draws a fixed amount of current from the communication bus when the communication bus provides a fixed direct (DC) voltage.

13. The apparatus of claim 9, wherein:
the electrical component draws an amount of current during the first time period and not during the second time period, when the communication bus uses an amount of current during a first time period that is greater than an amount of current during a second time period mutually exclusive from the first time period.

14. The apparatus of claim 9, wherein:
the electrical component has a first portion and a second portion, the first portion of the electrical component including a power harvesting circuit and an energy storage device,
the power harvesting circuit receives power from the communication bus and stores the power in the energy storage device, when the communication bus is operative,
the second portion of the electrical component receives power from the energy storage device when the second portion of the electrical component is operative and after the energy storage device has stored power.

15. An apparatus, comprising:
a host electrical system including a power source, a communication bus, and a host electrical component connected to the power source and the communication bus; and
an electrical component connected to the communication bus, the electrical component powered by at least some power obtained directly from the communication bus from power allocated for use on the communication bus, when the host electrical system is operative, such that (1) performance of the communication bus does not fall below a specified performance for the communication bus when the electrical component is powered by the communication bus, and (2) performance of the host electrical component is not negatively affected when the electrical component is powered by the communication bus.

16. The apparatus of claim 15, wherein the electrical component is not connected to the power source, the electrical component is powered by the communication bus without being powered by the power source when the host electrical system is operative.

17. The apparatus of claim 15, wherein the electrical component is connected to the power source, the electrical component is powered collectively by the communication bus and the power source when the host electrical system is operative such that an amount of power drawn from the power source by the electrical component is less than if the electrical component was powered by the power source without the communication bus.

18. The apparatus of claim 15, wherein the communication bus provides a fixed direct current (DC) voltage when the host electrical system is operative, the electrical component draws a fixed amount of current from the communication bus when the host electrical system is operative.

19. The apparatus of claim 15, wherein:
the communication bus uses an amount current during a first time period and an amount of current during a second time period mutually exclusive from the first time period, when the host electrical system is operative, the amount of current during the first time period being larger than the amount of current during the second time period, the electrical component draws an amount of current during the first time period and not during the second time period, when the host electrical system is operative.

20. The apparatus of claim 15, wherein:

the electrical component includes a first portion and a second portion, the first portion of the electrical component including a power harvesting circuit and an energy storage device, the power harvesting circuit receives power from the communication bus and store the power in the energy storage device, when the host electrical system is operative, the second portion of the electrical component receives energy from the energy storage device, when the energy storage device is operative.

21. The apparatus of claim 15, wherein:

the communication bus includes a first line and a second line, the electrical component includes a power harvesting circuit having a first portion, a second portion, and a controller, the first portion of the power harvesting circuit is operatively coupled to the first line of the communication line, the first portion of the power harvesting circuit storing energy from the communication bus when activated by the controller, the second portion of the power harvesting circuit is operatively coupled to the second line of the communication line the second portion of the power harvesting circuit storing energy from the communication bus when activated by the controller.

\* \* \* \* \*